US008857719B2

(12) United States Patent
Liu et al.

(10) Patent No.: US 8,857,719 B2
(45) Date of Patent: Oct. 14, 2014

(54) DECODING BARCODES DISPLAYED ON CELL PHONE

(71) Applicant: Symbol Technologies, Inc., Schaumburg, IL (US)

(72) Inventors: Rong Liu, Centereach, NY (US); Edward D. Barkan, Miller Place, NY (US); Dayou Wang, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 61 days.

(21) Appl. No.: 13/674,361

(22) Filed: Nov. 12, 2012

(65) Prior Publication Data

US 2013/0181055 A1 Jul. 18, 2013

Related U.S. Application Data

(60) Provisional application No. 61/586,808, filed on Jan. 15, 2012.

(51) Int. Cl.
*G06K 7/10* (2006.01)
*G06K 7/14* (2006.01)

(52) U.S. Cl.
CPC .......... *G06K 7/1404* (2013.01); *G06K 7/10722* (2013.01)
USPC .......... 235/462.42

(58) Field of Classification Search
CPC .......... G06K 7/10722; G06K 7/1404
USPC .......... 235/462.08, 462.15, 462.41, 462.42
See application file for complete search history.

(56) References Cited

U.S. PATENT DOCUMENTS

| | | | | |
|---|---|---|---|---|
| 5,637,854 | A | 6/1997 | Thomas | |
| 5,786,582 | A * | 7/1998 | Roustaei et al. | 235/462.07 |
| 6,877,661 | B2 | 4/2005 | Webb et al. | |
| 7,148,923 | B2 | 12/2006 | Harper et al. | |
| 7,172,125 | B2 | 2/2007 | Wang et al. | |
| 7,575,167 | B2 | 8/2009 | Kotlarsky et al. | |
| 7,762,464 | B2 | 7/2010 | Goren et al. | |
| 2002/0070278 | A1 | 6/2002 | Hung et al. | |
| 2008/0073434 | A1 * | 3/2008 | Epshteyn et al. | 235/454 |
| 2008/0296379 | A1 | 12/2008 | Hepworth et al. | |
| 2010/0213259 | A1 * | 8/2010 | Gao | 235/469 |
| 2011/0063325 | A1 * | 3/2011 | Saunders | 345/639 |

OTHER PUBLICATIONS

PCT International Search Report and Written Opinion of Application No. PCT/2012/020950 mailed Mar. 18, 2013 corresponding to counterpart U.S. Appl. No. 13/674,361.

* cited by examiner

*Primary Examiner* — Seung Lee
(74) *Attorney, Agent, or Firm* — Nong-Qiang Fan

(57) ABSTRACT

A method of decoding a barcode includes generating a first illumination towards a target object with a first illumination level, capturing a first image during a first exposure time period, and determining a first location and a second location on a scan line in the first image to find a switchover condition. If the switchover condition indicates the presence of a mobile display device, the method further includes generating a second illumination towards the target object with a second illumination level, capturing a second image during a second exposure time period, and decoding the barcode in the second image. Here, at least one of the second illumination level and the second exposure time period is determined based on values of pixels on the scan line between the first location and the second location.

17 Claims, 6 Drawing Sheets

DECODING BARCODES DISPLAYED ON CELL PHONE

RELATED APPLICATIONS

The present application is related to claims benefit under 35 U.S.C. §119(e) from U.S. Provisional Patent Application Ser. No. 61/586,808, filed Jan. 15, 2012, titled "AUTOMATIC MODE SWITCHING FOR BARCODES DISPLAYED ON CELL PHONE", the entire contents of which being incorporated herein by reference.

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
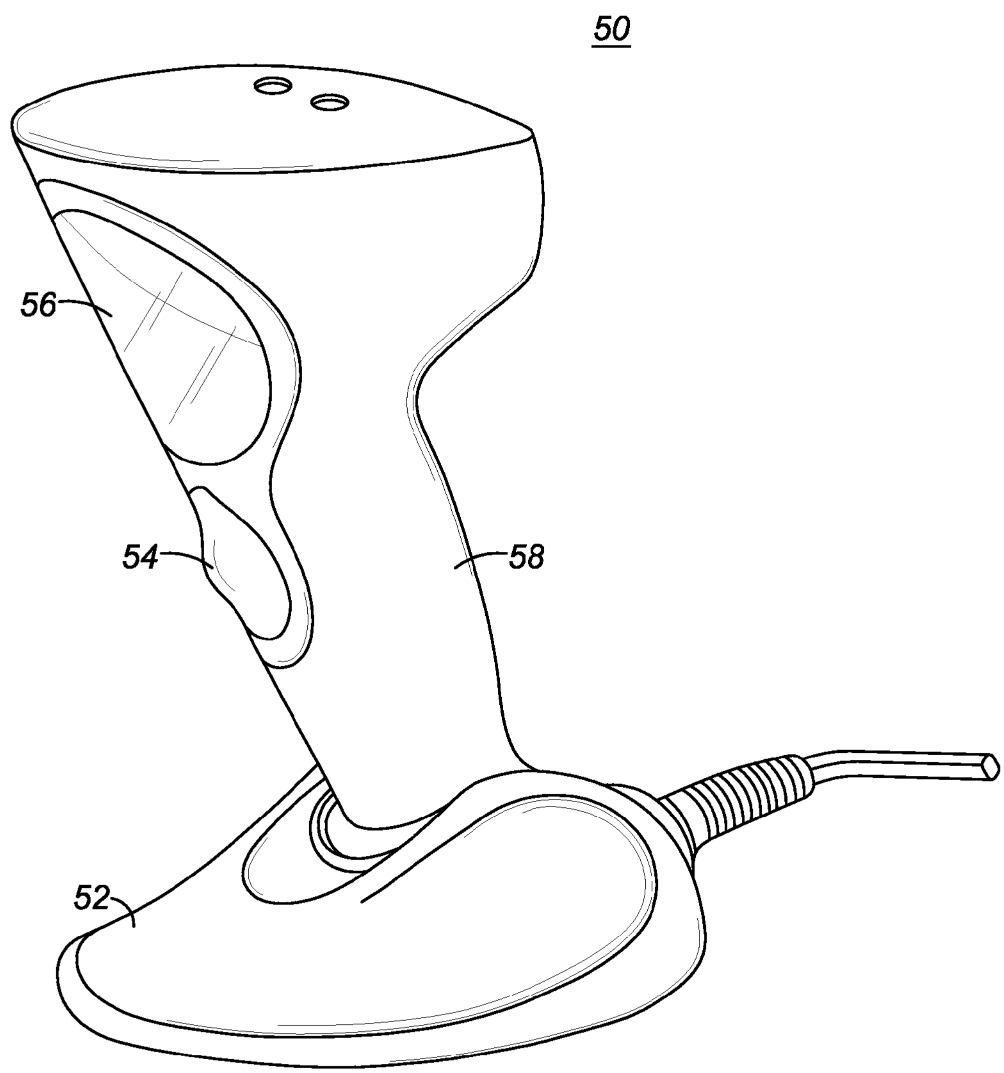
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
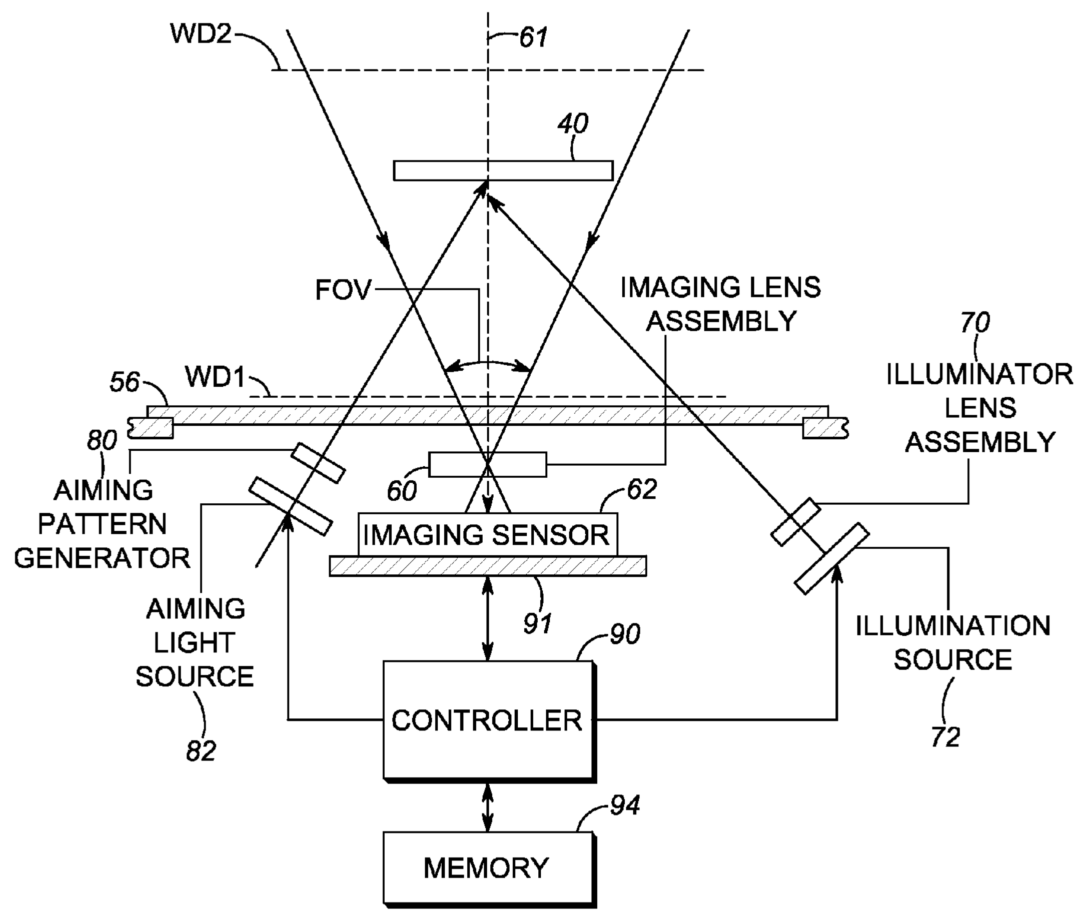
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Imaging barcode readers generally have its own internal illumination system to provide light to a barcode target. The light source is generally collinear with the imaging system for efficiency. This works well on barcodes on printed media because reflected light is generally scattered. Recent years the barcode industry has witnessed the rise of indicia presented on electronic media such as cell phones. Generally, the barcode is presented on an LC or AMOLED display behind a glass window. Unfortunately specular reflection of the light source from the glass usually blinds the imagers and confuses exposure routine. Subsequently, the embedded illumination must be turned off and exposure time increased to read such barcodes. The controller of the reader may have multiple exposure times: short to read paper barcodes and avoid hand-jitter, and long exposure to read electronic barcodes when it is dimly lit. However, the disadvantage is that this usually requires a special mode and often results in less aggressive perceived scanning performance. Moreover, since the illumination needs to be off during long exposure, the blinking of the LEDs becomes noticeable and is often not desirable or acceptable.

In linear imager, the problem with specular reflection can be mitigated by tilting the cell phone at a substantial angle to the scanner. However, it was found that the display transmittance falls off exponentially as function of angle, which usually results in long pixel exposures. It was also found that the grinded edges of the glass windows and shinny frames around the cell phone reflect incident light to all directions that even at sufficiently large reading angle (pitch), two symmetrical (could be asymmetrical depending on the yaw angle) bands of light still appear on the captured image. These regions are typically brighter than the barcode displayed on a dimly lit cell phone. Therefore, this often confuses the auto exposure routine and results in no decode.

It is desirable to have an imaging scanner that utilizes special features on the cell phone to automatically enter a mode optimized for reading barcodes displayed on cell phones. Most modern cell phones use chemically strengthened glass as cover windows for the display. The edges of the windows are typically chamfered and grinded for improved durability and safety during handling. The frame or enclosure surrounding the cover windows can be either shinny or dull. The grinded edges and the frame (especially with normal wear and tear) on the cell phone can randomly scatter incident light that the reflections are picked up by the sensor even at oblique pitch angles. These reflections emerge as bright or saturated bands on the captured image. They can consist of different sizes depending on the distance of cell phone to the scanner, or the size and surface finish of the grinded window edges and the surrounding frames.

Figure 3A:
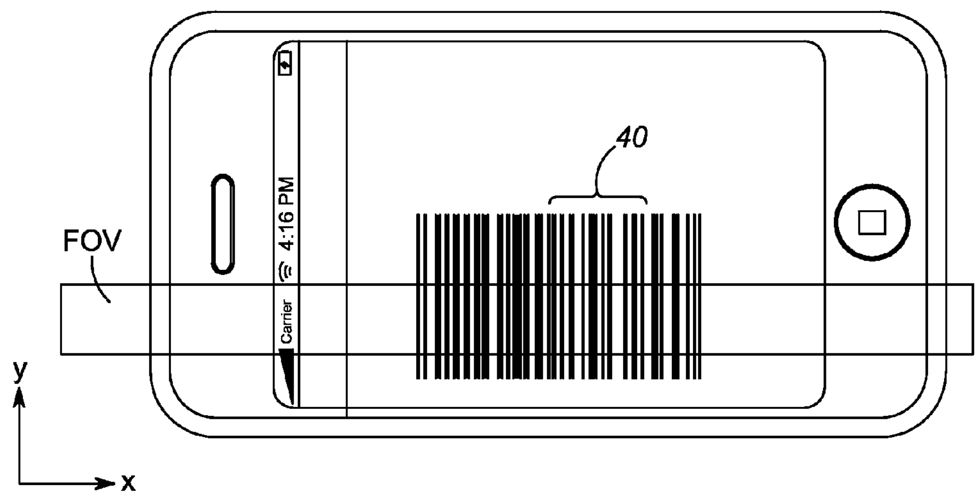
FIG. 3A shows a barcode displayed on a cell phone is scanned by a liner imager with the barcode aligned with the field of view (FOV) of the liner imager.
Figure 3B:
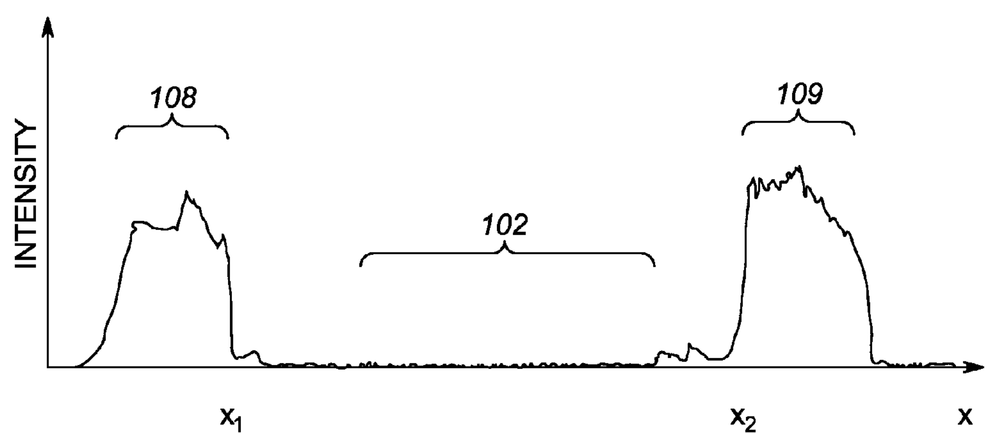
FIG. 3B show a plot of pixel brightness profile across an image of the parts of the barcode and the cell phone within the FOV in the FIG. 3A.

This presents a serious challenge to decode barcodes displayed on dimly lit cell phones. The contrast between the bright bands and the actual mobile barcode are so high that a typical automatic exposure routine will completely ignore or miss the barcode of interest. FIG. 3A shows a barcode 40 displayed on a cell phone 45 is scanned by a liner imager, with the barcode 40 aligned with the field of view (FOV) of the liner imager. FIG. 3B show a plot of pixel brightness profile across an image of the parts of the barcode 40 and the cell phone 45 within the FOV in the FIG. 3A, with the corresponding horizontal axis aligned accordingly, when the display brightness of the cell phone 45 is set to a relatively low level. In FIG. 3B, the pixel brightness profile shows two nearly saturated bands 108 and 109 outside the quiet region 102 of the barcode. These bright regions can be either hand holding the mobile device, background or bright reflected surfaces as described earlier. The part between the bright regions can either be total dark or be so dim that sometimes only part of the entire barcode is shown. As can be easily seen on the plot in FIG. 3B, there is little or no modulation in the region corresponding to the actual display area. It would be desirable to have an imagining scanner that has certain automatic exposure (AE) control for adjusting the amount of the exposure to achieve desired setting for at least for the part of the image that contains the barcode. It would be desirable to have a method to detect the presence of a mobile device and adjust the exposure accordingly so that the mobile screen showing the barcode will get adequate exposure to ensure successful decoding.

In this following, a method of decoding a barcode with an imaging scanner having automatic exposure (AE) control is described. The imaging scanner includes an imaging sensor having an array of photosensitive elements. In general, the method of decoding a barcode within an imaging field of view of imaging scanner includes the following: (1) generating a first illumination towards a target object with a first illumination level; (2) detecting light from the target object with the array of photosensitive elements in the imaging sensor while the target object is illuminated by the first illumination to capture a first image during a first exposure time period; (3) determining a first location and a second location on a scan line in the first image to find a switchover condition. If the switchover condition indicates the presence of a mobile display device in the first image, the above described method further includes the following: (1) generating a second illumination towards the target object with a second illumination level, (2) detecting light from the target object with the array of photosensitive elements in the imaging sensor while the target object is illuminated by the second illumination to capture a second image during a second exposure time period, and (3) decoding the barcode in the second image. Here, at least one of the second illumination level and the second exposure time period is determined based on values of pixels on the scan line between the first location and the second location in the first image.

Figure 4:
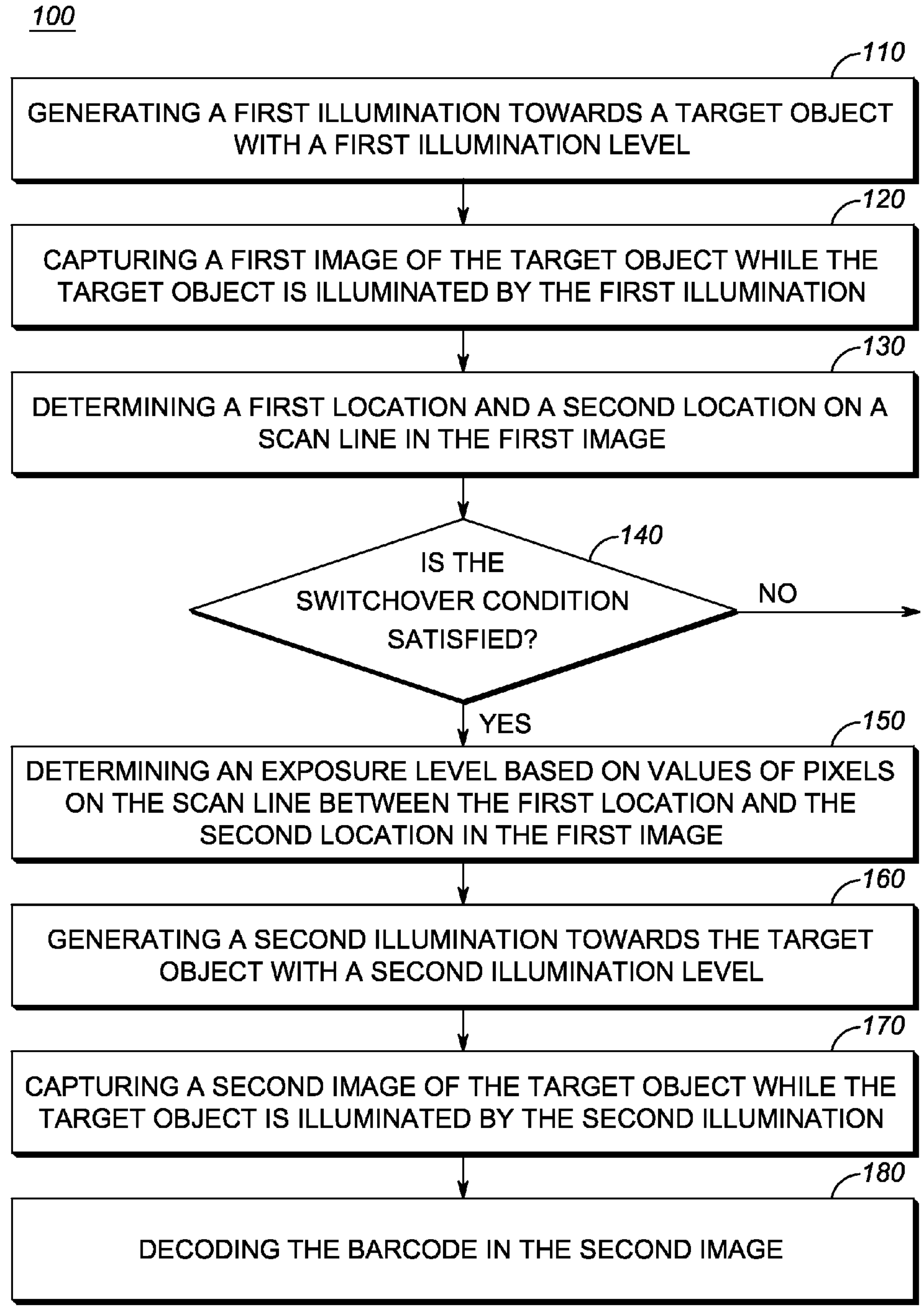
FIG. 4 is a flowchart of a method 100 of decoding a barcode in accordance with some embodiments.

FIG. 4 is a flowchart of a method 100 of decoding a barcode in accordance with some embodiments. As shown in FIG. 4, at block 110 and block 120, a first illumination is generated towards the target object 45 with a first illumination level, and a first image of the target object 45 is captured with first exposure time period while the target object is illuminated by the first illumination. Then, at block 130, a first location and a second location on a scan line in the first image is determined, and the switchover condition is evaluated at block 140 to detect the presence of mobile device. In some implementations, if the switchover condition is not met, the first image is processed for decoding a barcode. In some other implementations, if the switchover condition is not met, the method 100 will restart from block 110.

Figure 5:
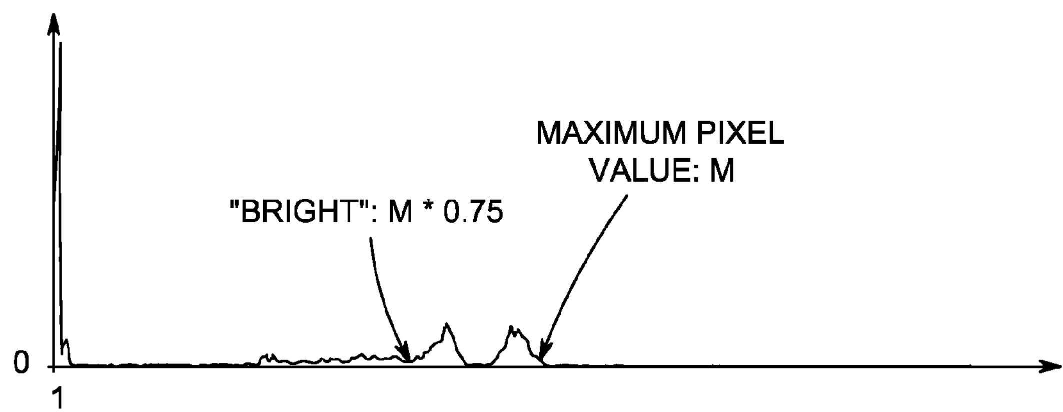
FIG. 5 is the histogram of the pixel brightness profile in FIG. 3B

In order to determine the switchover condition, the value of “bright” needs to be defined. This value is obtained from histogram of the scan. FIG. 5 is the histogram of the pixel brightness profile in FIG. 3B. The index of the maximum non-zero element of the histogram is the maximum pixel value of the scan. We define the value of “bright” to be a certain percentage of the maximum brightness, say 75%. In some implementations, such threshold pixel value is set at a predetermined fraction of the maximum pixel value in the first image, and the predetermined fraction can be chosen to be a number between 60% to 90%. Based on the assumption that the mobile device display is in the center, or near its proximity, of the scan line, the algorithm searches from the center of the scan to the left and right and stops at the locations of which the value of the pixel reaches “bright”. The left and right locations are respectively used as the first location and the second location on the scan line for finding the switchover condition. The distance between the left and right locations is the size of the mobile device display scaled by the lens magnification. If the size is large enough, say more than ¼ of the total scan, the algorithm determines that a mobile device is been scanned. In other implementations, the algorithm determines that a mobile device is been scanned, if the distance from the left location to the right location as the percentage of the total length of the scan line is larger than a predetermined factor which can be chosen to be a number between 20% to 80%.

Figure 3C:
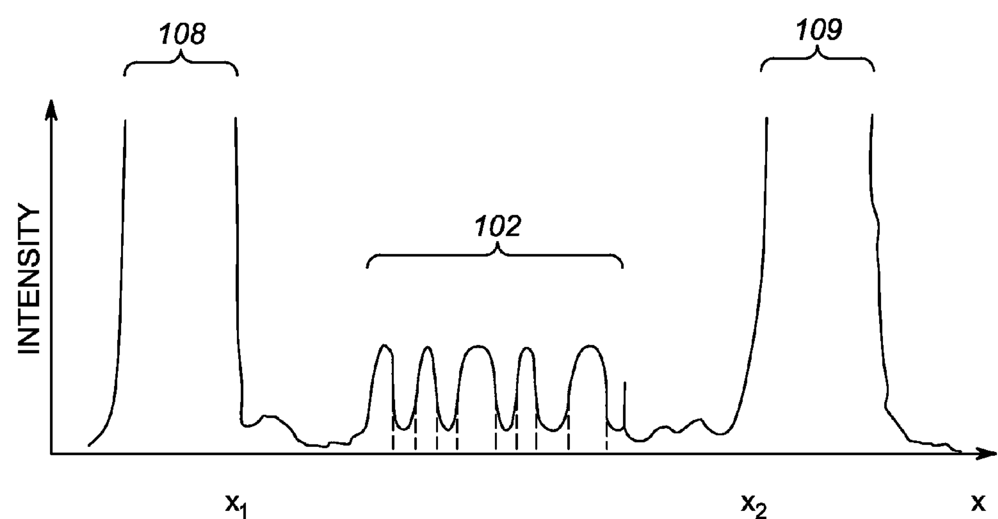
FIG. 3C show a plot of pixel brightness profile across an image of the parts of the barcode and the cell phone within the FOV in the FIG. 3A after the exposure is adjusted is based on the center portion of the scan.

As shown in FIG. 4, if the switchover condition is satisfied, then, at block 150, an exposure level based on values of pixels on the scan line between the first location and the second location in the first image is determined That is, if it is determined that a mobile device is been scanned, the automatic exposure (AE) control will adjust exposure based on center portion of the scan. The result is a brighter portion covering mobile device screen and very bright regions surrounding the center, which makes it possible to decode the barcodes on very dim displays. For example, as shown in FIG. 3C, after the exposure is adjusted is based on the center portion of the scan, the region 102 corresponding to the barcode will have significant brightness modulations in the pixel brightness profile, despite that the brightness of the band 108 and band 109—which are outside the region corresponding to the actual display area—can be so bright as to be off the scale. In FIG. 4, after the new (or second) exposure level is determined, at block 160 and block 170, a second illumination is generated towards the target object with a second illumination level, and a second image of the target object is captured by the second exposure time period the while the target object is illuminated by the second illumination. Finally, at block 180, the barcode in the second image is decoded.

The method described above can be applied to both the linear imager and the area imager. The barcode on the cell phone can be 1-d barcode or 2-d barcode. When above described method is applied to the linear imager, the scan line can be formed by one or more parallel 1-d arrays of photosensitive elements. When above described method is applied to the area imager that includes a two-dimensional array of photosensitive elements, and the scan line can be formed by a virtual scan line formed by pixels in the first image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of decoding a barcode within an imaging field of view of an imaging system that includes an imaging sensor having an array of photosensitive elements, the method comprising:

generating a first illumination towards a target object with a first illumination level;

detecting light from the target object with the array of photosensitive elements in the imaging sensor while the target object is illuminated by the first illumination to capture a first image during a first exposure time period;

determining a first location and a second location on a scan line in the first image to find a switchover condition;

if the switchover condition indicates the presence of a mobile display device in the first image, (1) generating a second illumination towards the target object with a second illumination level, and (2) detecting light from the target object with the array of photosensitive elements in the imaging sensor while the target object is illuminated by the second illumination to capture a second image during a second exposure time period;

wherein at least one of the second illumination level and the second exposure time period is determined based on values of pixels on the scan line between the first location and the second location in the first image; and finding a selected distance between the first location and the second location on the scan line; and wherein the switchover condition indicates the presence of a mobile display device in the first image if the ratio between the selected distance and the total length of the scan line in the first image is larger than a predetermined factor.

2. The method of claim 1, wherein the predetermined factor is chosen to be between 20% to 80%.

3. The method of claim 1, wherein the predetermined factor is chosen to be 25%.

4. The method of claim 1, wherein said determining comprises determining a threshold pixel value for finding the first location and the second location on the scan line.

5. The method of claim 1, wherein said determining comprises determining a threshold pixel value for finding the first location and the second location on the scan line, wherein the threshold pixel value is determined from a histogram of the first image.

6. The method of claim 1, wherein the array of photosensitive elements forms the scan line of a linear imaging device.

7. A method of decoding a barcode within an imaging field of view of an imaging system that includes an imaging sensor having an array of photosensitive elements, the method comprising:

generating a first illumination towards a target object with a first illumination level;

detecting light from the target object with the array of photosensitive elements in the imaging sensor while the target object is illuminated by the first illumination to capture a first image during a first exposure time period;

determining a first location and a second location on a scan line in the first image to find a switchover condition;

if the switchover condition indicates the presence of a mobile display device in the first image, (1) generating a second illumination towards the target object with a second illumination level, and (2) detecting light from the target object with the array of photosensitive elements in the imaging sensor while the target object is illuminated by the second illumination to capture a second image during a second exposure time period;

wherein at least one of the second illumination level and the second exposure time period is determined based on values of pixels on the scan line between the first location and the second location in the first image;

determining a threshold pixel value for finding the first location and the second location on the scan line, wherein the threshold pixel value is set at a predetermined fraction of the maximum pixel value in the first image; and wherein the predetermined fraction is chosen to be between 60% to 90%.

8. The method of claim 7, wherein the predetermined fraction is chosen to be 75%.

9. A method of decoding a barcode within an imaging field of view of an imaging system that includes an imaging sensor having an array of photosensitive elements the method comprising:

generating a first illumination towards a target object with a first illumination level;

detecting light from the target object with the array of photosensitive elements in the imaging sensor while the target object is illuminated by the first illumination to capture a first image during a first exposure time period;

determining a first location and a second location on a scan line in the first image to find a switchover condition;

if the switchover condition indicates the presence of a mobile display device in the first image, (3) generating a second illumination towards the target object with a second illumination level, and (4) detecting light from the target object with the array of photosensitive elements in the imaging sensor while the target object is illuminated by the second illumination to capture a second image during a second exposure time period;

wherein at least one of the second illumination level and the second exposure time period is determined based on values of pixels on the scan line between the first location and the second location in the first image; and wherein the array of photosensitive elements is a two-dimensional array of photosensitive elements, and wherein the scan line is a virtual scan line formed by pixels in the first image.

10. A method of decoding a barcode within an imaging field of view of an imaging system that includes an imaging sensor having an array of photosensitive elements, the method comprising:

generating a first illumination towards a target object with a first illumination level;

detecting light from the target object with the array of photosensitive elements in the imaging sensor while the target object is illuminated by the first illumination to capture a first image during a first exposure time period;

determining a first location and a second location on a scan line in the first image to find a switchover condition;

if the switchover condition indicates the presence of a mobile display device in the first image, (1) generating a second illumination towards the target object with a second illumination level, and (2) detecting light from the target object with the array of photosensitive elements in the imaging sensor while the target object is illuminated by the second illumination to capture a second image during a second exposure time period;

wherein at least one of the second illumination level and the second exposure time period is determined based on values of pixels on the scan line between the first location and the second location in the first image; and wherein the imaging sensor has a gain associated therewith, and wherein at least one of the second illumination level, the second exposure time period, and the gain of the imaging sensor is determined based on pixels on the scan line between the first location and the second location in the first image.

11. An apparatus comprising:

an imaging lens arrangement;

an imaging sensor including an array of photosensitive elements configured to operate together with the imaging lens arrangement for detecting light from a target object within an imaging field of view;

an illumination source for generating an illumination;

a controller configured for generating a first illumination towards the target object with a first illumination level, detecting light from the target object with the array of photosensitive elements in the imaging sensor while the target object is illuminated by the first illumination to capture a first image during a first exposure time period, determining a first location and a second location on a scan line in the first image to find a switchover condition, and finding a selected distance between the first location and the second location on the scan line;

wherein the switchover condition indicates the presence of a mobile display device in the first image if the ratio between the selected distance and the total length of the scan line in the first image is larger than a predetermined factor;

wherein the controller is further configured for, in the event that the switchover condition indicates the presence of a mobile display device in the first image, generating a second illumination towards the target object with a second illumination level, and detecting light from the target object with the array of photosensitive elements in the imaging sensor while the target object is illuminated by the second illumination to capture a second image during a second exposure time period; and wherein at least one of the second illumination level and the second exposure time period is determined based on values of pixels on the scan line between the first location and the second location in the first image.

12. The apparatus of claim 11, wherein the controller configured for decoding a barcode in the second image.

13. The apparatus of claim 11, wherein the array of photosensitive elements forms the scan line of a linear imaging device.

14. An apparatus comprising:

an imaging lens arrangement;

an imaging sensor including an array of photosensitive elements configured to operate together with the imaging lens arrangement from a target object within an imaging field of view;

an illumination source for generating an illumination;

a controller configured for generating a first illumination towards the target object with a first illumination level, detecting light from the target object with the array of photosensitive elements in the imaging sensor while the target object is illuminated by the first illumination to capture a first image during a first exposure time period, and determining a first location and a second location on a scan line in the first image to find a switchover condition;

wherein the controller is further configured for, in the event that the switchover condition indicates the presence of a mobile display device in the first image, generating a second illumination towards the target object with a second illumination level, and detecting light from the target object with the array of photosensitive elements in the imaging sensor while the target object is illuminated by the second illumination to capture a second image during a second exposure time period;

wherein at least one of the second illumination level and the second exposure time period is determined based on values of pixels on the scan line between the first location and the second location in the first image; and wherein the array of photosensitive elements is a two-dimensional array of photosensitive elements, and wherein the scan line is a virtual scan line formed by pixels in the first image.

15. An apparatus comprising:

an imaging lens arrangement;

an imaging sensor including an array of photosensitive elements configured to operate together with the imaging lens arrangement from a target object within an imaging field of view;

an illumination source for generating an illumination;

a controller configured for generating a first illumination towards the target object with a first illumination level, detecting light from the target object with the array of photosensitive elements in the imaging sensor while the target object is illuminated by the first illumination to capture a first image during a first exposure time period, and determining a first location and a second location on a scan line in the first image to find a switchover condition;

wherein the controller is further configured for, in the event that the switchover condition indicates the presence of a mobile display device in the first image, generating a second illumination towards the target object with a second illumination level, and detecting light from the target object with the array of photosensitive elements in the imaging sensor while the target object is illuminated by the second illumination to capture a second image during a second exposure time period;

wherein at least one of the second illumination level and the second exposure time period is determined based on values of pixels on the scan line between the first location and the second location in the first image; and wherein the imaging sensor has a gain associated therewith, and wherein at least one of the second illumination level, the second exposure time period, and the gain of the imaging sensor is determined based on values of pixels on the scan line between the first location and the second location in the first image.

16. A method of decoding a barcode within an imaging field of view of an imaging system that includes an imaging sensor having an array of photosensitive elements, the method comprising:

generating a first illumination towards a target object with a first illumination level;

detecting light from the target object with the array of photosensitive elements in the imaging sensor while the target object is illuminated by the first illumination to capture a first image during a first exposure time period;

determining a first location and a second location on a scan line in the first image to find a switchover condition;

if the switchover condition indicates the presence of a mobile display device in the first image, (1) generating a second illumination towards the target object with a second illumination level, (2) detecting light from the target object with the array of photosensitive elements in the imaging sensor while the target object is illuminated by the second illumination to capture a second image during a second exposure time period, and wherein at least one of the second illumination level and the second exposure time period is determined based on values of pixels on the scan line between the first location and the second location in the first image, and (3) decoding the barcode in the second image; and wherein the array of photosensitive elements is a two-dimensional array of photosensitive elements, and wherein the scan line is a virtual scan line formed by pixels in the first image.

17. The method of claim 16, wherein the array of photosensitive elements forms the scan line of a linear imaging device.

* * * * *